April 18, 1950 C. E. TORSCH 2,504,235

SYNCHRONIZING SYSTEM

Filed May 29, 1945 2 Sheets-Sheet 1

INVENTOR.
CHARLES E. TORSCH
BY H. S. Grover
ATTORNEY

April 18, 1950 C. E. TORSCH 2,504,235

SYNCHRONIZING SYSTEM

Filed May 29, 1945 2 Sheets-Sheet 2

INVENTOR.
CHARLES E. TORSCH
BY
H. S. Grover
ATTORNEY

Patented Apr. 18, 1950

2,504,235

UNITED STATES PATENT OFFICE 2,504,235

SYNCHRONIZING SYSTEM

Charles Edward Torsch, Lancaster Township, Lancaster County, Pa., assignor to Radio Corporation of America, a corporation of Delaware Application May 29, 1945, Serial No. 596,475

1 Claim. (Cl. 178—69.5)

The present invention relates to an electronic system. For example, it relates to a system employing cathode ray tubes having deflectable cathode ray scanning beams. More particularly, the invention is directed to novel arrangements for controlling the deflection of the cathode ray beam in one cathode ray tube so that it is deflected in step with the cathode ray beam in another tube.

The primary object of the present invention is to provide for control of the deflection of a cathode ray beam in a monitor scanner in step with the deflection of a cathode ray beam used to originate image signals or to produce a visible image in a television radio receiver or the like.

Another object of the invention is to provide image monitoring equipment for a television system having novel means for effecting synchronization of the monitor scanner.

Still another object of the invention is to provide for synchronizing the operation of a monitor in a system having a transmitter, an image monitor, and an image receiver.

Other and more specific objects of the invention will become apparent and suggest themselves to those skilled in the art to which the invention is directed upon reading the following specification and claim in connection with the accompanying drawings in which:

Figures 1, 2:
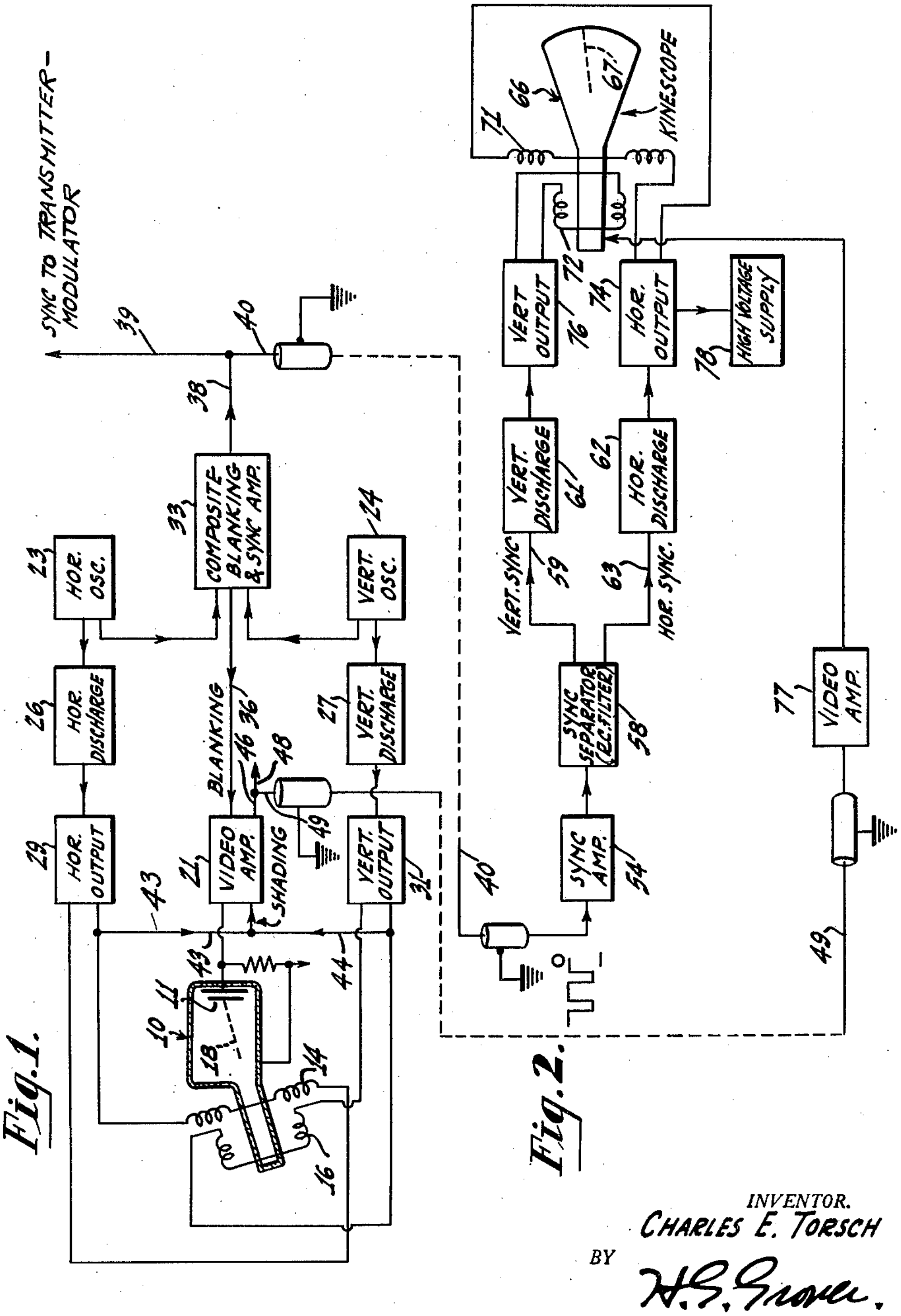
Fig. 1 is a schematic representation of a transmitter having means for connection to a monitor to provide a system embodying the present invention.
Fig. 2 is a diagrammatic showing of a monitor embodying the present invention.

Referring to Fig. 1 of the drawings, there is shown, illustratively, a television transmitter which is somewhit conventional and comprises a camera tube 10 shown as being of the so-called storage type (for instance, those known as the "Iconoscope," "Orthicon" or the like) containing a light sensitive mosaic 11 and the usual auxiliary electrodes and electron emitters (not shown in detail since these are known in the art). These electrodes include the usual electron gun comprising an anode and a cathode for producing a cathode ray beam. The cathode ray beam deflecting means or yoke is indicated conventionally and may comprise horizontal and vertical deflecting coils 14 and 16, respectively, for producing a scanning movement of the cathode ray beam 13 which is directed on the mosaic 11 to release a signal output therefrom to a suitable load circuit. The released signal output of the camera tube 10 is applied to a video amplifier 21 in the present instance.

Horizontal (usually line frequency) and vertical (usually field frequency) oscillators 23 and 24, respectively, produce voltage impulses which are applied in the usual manner to control a horizontal discharge stage 26 and a vertical discharge stage 27, respectively. The output from the horizontal discharge stage 26, which is in the nature of a sawtooth wave generated at the line frequency at which the mosaic is scanned, is applied to a horizontal output stage 29 for amplification where this is desirable or necessary. In a like manner, the output from the vertical oscillator 24 is applied to control a vertical discharge stage 27, the output from the latter being amplified in a vertical output stage 31 and applied to the vertical deflection yoke 16. The vertical discharge stage 27 operates to provide a sawtooth wave of frame or field frequency in a manner by now well known in the art.

A composite blanking and sync amplifier 33 receives a portion of the output from the horizontal and vertical oscillators 23 and 24, respectively, and provides a blanking signal over a connection 36 to the video amplifier 21 which amplifies the blanking signal along with the image signal from the camera tube 10. The sync signal output of the composite blanking and sync amplifier 33 appears in a connection 38 and is delivered over a connection 39 to the modulator of a radio transmitter (neither shown). A connection 40 also supplies the sync signal output of the amplifier 33 to a monitor receiver later to be described. Shading signals, the function of which is by now well known in the art, are applied from the horizontal output stage 29 and the vertical output stage 31 by way of connections 43 and 44 to the video amplifier 21. The video and blanking signals as modified by the shading signal, appear in amplified form at a connection 46 which is branched, as shown, one branch designated 48 furnishing the combined signal to the previously mentioned radio transmitter (not shown). Another branch 49 of the connection 46 connects with the monitor receiver of Fig. 2 which will now be described.

Referring to Fig. 2 of the drawings, the entire image producing system of the monitor is shown schematically, this system being employed for directly producing an image from the signals derived from the camera tube 10. This monitor is of the "driven" variety, this term being selected to denote a "Kinescope" beam system in which the scanning is automatically synchronized with the deflection signals which serve to operate an associated camera tube. By doing this, the need for manual adjustment of the speeds of oscillators employed in conventional monitors is eliminated to simplify operation. The video signal and the sync signal are or may be transmitted to the monitor receiver from the pickup system of Fig. 1 over a cable, the cable also including conductors for supplying operating power to the monitor. For the sake of convenience of illustration, separate conductors 40 and 49 in cables of the coaxial type have been shown, but it will be understood that for relatively short distances, a twisted pair may be employed. Also, a single cable may be employed having four conductors, one being grounded. The remaining conductors may be the conductors 40 and 49 together with a low voltage conductor for providing driving power to a dynamotor (not shown) at the monitor. All of the power requirements of the monitor system may be satisfied by the dynamotor.

The sync input to the monitor arriving via the connection 40 is a series of negative voltage pulses which is amplified by an amplifier 54. The amplified pulses are applied to a device 58 for separating the vertical sync pulses from the horizontal sync pulses. The separated vertical pulses are impressed by way of a connection 59 on the vertical discharge stage 61. The horizontal pulses are impressed on the horizontal discharge stage 62 by way of connection 63.

The monitor includes an image producing tube 66 equipped with a cathode ray gun structure (not shown) for developing an electron scanning beam. An example of a tube of this type is the well known "Kinescope." Horizontal and vertical deflecting coils 71 and 72 are connected to horizontal and vertical output stages 74 and 76, respectively, the latter serving to amplify the outputs from the respective discharge stages 62 and 61. An image producing tube and its associated deflecting circuits, which are referred to purely by way of example, is shown in United States patent to Vance, No. 2,137,039, granted November 15, 1938, and in a patent to Tolson, No. 2,101,520, granted December 17, 1937. The last named patent shows a discharge tube oscillator indicated by reference characters 32 and 32*a*. Discharge tube oscillators are discussed on page 146 of "Principles of Television Engineering" by Fink, first edition, McGraw-Hill Book Company, Inc. These citations are given solely by way of example. The various electrodes of the tube 66 are to be supplied as usual with suitable operating potentials. This may be done as shown in United States patent to Tolson, No. 2,124,478, granted July 19, 1938. The input from the conductor 49 is amplified by an amplifier 77 and is employed to modulate the beam 67 in the tube 66.

It will be understood that the vertical output stage 76 will include an output transformer, if necessary, for impedance matching purposes. The output transformer (not shown) of the output stage 74 is arranged to provide high voltage polarization of the second anode (not shown) of the tube 66. This arrangement is indicated schematically at 78 on the drawings and is fully described in a United States patent to A. W. Vance, No. 2,074,495, granted March 23, 1937.

In operation of the monitor of Fig. 2 in conjunction with the pickup system of Fig. 1, the electron beam 67 in the tube 66 will be perfectly synchronized with the electron beam 18 in the camera tube 10. Operation of the monitor of Fig. 2 may also be had from the television receiver of Fig. 3 to provide an extension viewer.

Figure 3:
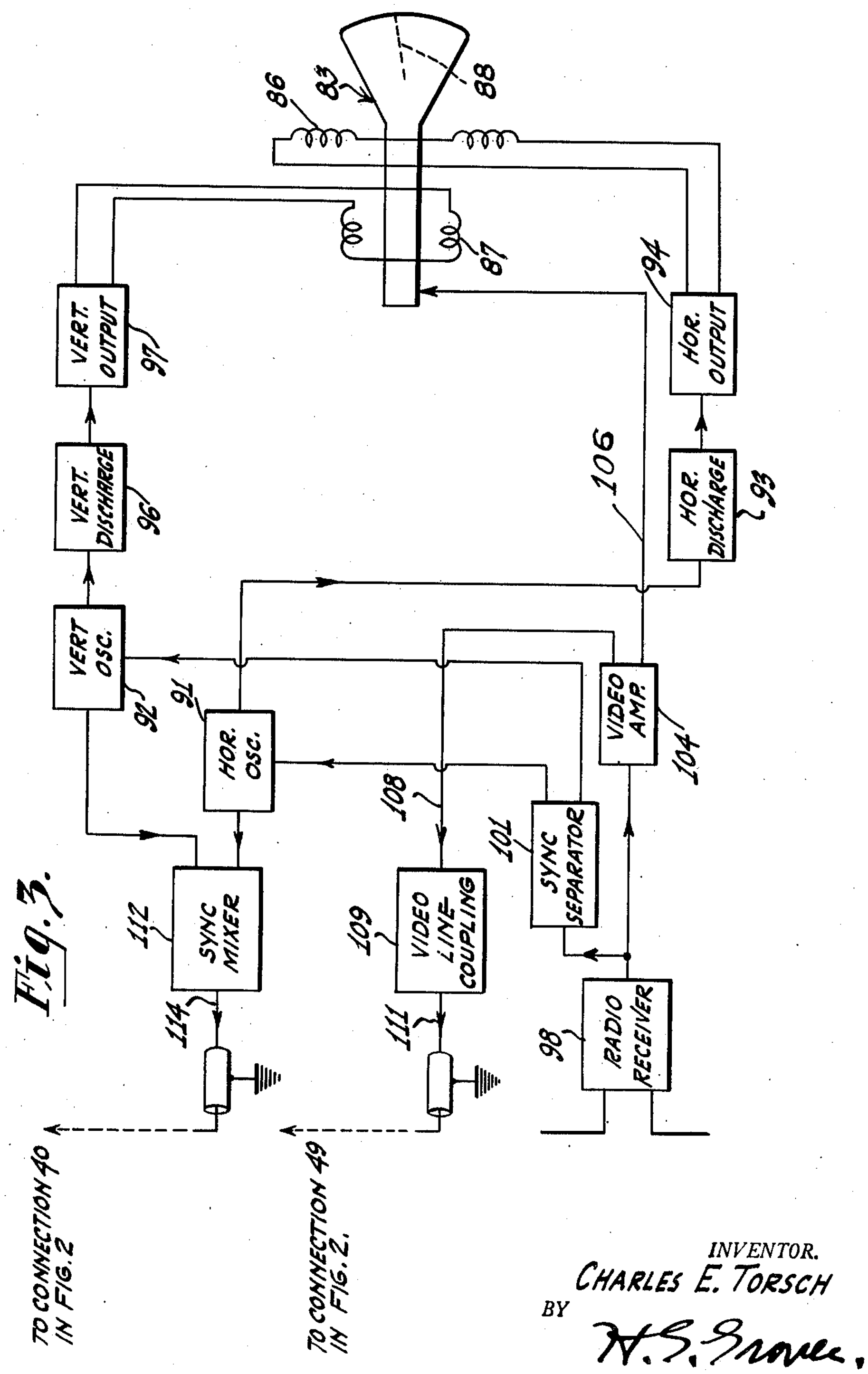
Fig. 3 is a diagrammatic showing of a receiver having means for connection to a monitor operable in accordance with this invention.

Referring to Fig. 3, the receiver comprises an image producing tube 83 which may be similar to the tube 66 of Fig. 2. Horizontal and vertical deflecting coils 86 and 87, respectively, provide for deflecting the scanning ray beam 88 under control of horizontal and vertical oscillators 91 and 92. A horizontal discharge stage 93 and a horizontal output stage 94 are connected to the horizontal deflecting coils 86. Likewise, a vertical discharge stage 96 and a vertical output stage 97 are connected to the vertical deflection coils 87.

A radio receiver 98, suitable for the reception of television signals from the transmitter of Fig. 1, for example, and equipped with the usual selective circuits, amplifiers and a demodulating device is connected as shown so that its output is furnished to a sync signal separator 101. The output from this sync separator is employed to control the horizontal and vertical oscillators in known manner. A video amplifier 104 is employed to modulate the beam 88 of the tube 83, signals for this purpose being fed to a connection 106. A connection 108 from the video amplifier 104 connects with the line coupling device 109 which matches the impedance of the output of the amplifier 104 to a connection 111. This connection 111 may be placed in communication, as indicated by the legend on the drawing, with the connection 49 of Fig. 2 so as to provide for modulation of the cathode ray beam 67 in the tube 66.

Pulses from both the horizontal oscillator 91 and the vertical oscillator 92 are mixed in a sync mixing device 112, the output of which appears in a connection 114, which may be placed in communication with the conductor 40 on Fig. 2 of the drawings to control synchronization of the deflection of the beam 67 of the tube 66 in step with the deflection of the beam 88 in the tube 83.

By the arrangement just described in connection with Fig. 3 of the drawings, it will be seen that an extension viewer is provided which will reproduce images appearing on the target or screen of the tube 83 which are scanned by the camera tube 10 of Fig. 1 of the drawings.

No local oscillators are employed in the equipment disclosed herein as distinguished from conventional monitors, and also distinguished from a conventional driving circuit such as has been employed heretofore in connection with the synchronization of scanning in a monitor which may be said to operate from yoke voltages or currents in the driver equipment instead of voltages derived more directly from the scanning oscillators.

It will be understood that in the system shown by way of example, the two components of a composite signal may be mixed together before monitoring and separated in the monitor by vacuum tube separator stages well known in the art, rather than passing the video signal and the sync signal separately from the transmitter to the monitor or from the receiver to the monitor. In the event that the sync signal and the video information component are transmitted together, the sync amplifier in the monitor, for example the amplifier 54, will preferably be designed to function as a limiting amplifier to equalize successive pulses arriving at the discharge stages 61 and 62, both in amplitude and duration. This is desirable since if successive positive pulses arriving at the discharge stages are not constant, the linearity and length of successive sweeps, at line or field scanning frequency, will be erratic and so reduce visual pattern resolution as to thereby destroy intelligibility of the system.

Having now described the invention, what is claimed and desired to be secured by Letters Patent is the following:

A television system comprising an image pickup system and a monitor, said image pickup system having voltage impulse producing master oscillators to control deflection of the cathode ray beam in an image pickup tube, said monitor having a cathode ray image producing tube, deflecting means for producing scanning deflection of the scanning beam in said image producing tube, discharge tube oscillators connected to said deflection control means, and means for feeding pulses from said oscillators in said transmitter system to said discharge tube means.

CHARLES EDWARD TORSCH.

REFERENCES CITED

The following references are of record in the file of this patent:

UNITED STATES PATENTS

| Number | Name | Date |
|---|---|---|
| 2,171,536 | Bingley | Sept. 5, 1939 |
| 2,258,943 | Bedford | Oct. 14, 1941 |
| 2,293,148 | Kell | Aug. 18, 1942 |
| 2,315,784 | Goodale | Apr. 6, 1943 |
| 2,329,339 | De Baum | Sept. 14, 1943 |
| 2,383,365 | Beers | Aug. 21, 1945 |